US012545562B1

(12) United States Patent
Ullom

(10) Patent No.: US 12,545,562 B1
(45) Date of Patent: Feb. 10, 2026

(54) ELECTRODE TRANSLATION CONTROL SYSTEM FOR AN ELECTRIC ARC FURNACE

(71) Applicant: Scott Michael Ullom, Hudson, WI (US)

(72) Inventor: Scott Michael Ullom, Hudson, WI (US)

( * ) Notice: Subject to any disclaimer, the term of this patent is extended or adjusted under 35 U.S.C. 154(b) by 951 days.

(21) Appl. No.: 17/662,344

(22) Filed: May 6, 2022

Related U.S. Application Data

(60) Provisional application No. 63/188,119, filed on May 13, 2021.

(51) Int. Cl.
*B66F 7/08* (2006.01)
*F27D 3/00* (2006.01)
*F27D 19/00* (2006.01)

(52) U.S. Cl.
CPC .................. *B66F 7/08* (2013.01); *F27D 3/00* (2013.01); *F27D 19/00* (2013.01); *F27D 2003/0065* (2013.01)

(58) Field of Classification Search
CPC .. B66F 7/20; B66F 7/08; B66F 7/0641; B66F 7/065; B66F 7/04; B66F 7/0625; B66F 7/243; B66F 7/26; B66F 7/28
USPC ........................................... 219/86.24, 86.41
See application file for complete search history.

(56) References Cited

U.S. PATENT DOCUMENTS 3,289,868 A * 12/1966 Miller ........................ B66F 3/46 414/498
3,625,115 A * 12/1971 Tani ........................ F15B 11/22 91/515
3,760,688 A * 9/1973 Dummer ............... B66C 23/705 91/532
4,091,715 A * 5/1978 Onderka ............... B63B 35/308 91/1
4,161,256 A * 7/1979 Seaberg .................. F15B 11/16 91/531

(Continued)

*Primary Examiner* — Chris Q Liu
(74) *Attorney, Agent, or Firm* — SHERRILL LAW OFFICES PLLC

(57) ABSTRACT

An electrode lift system for an electric arc furnace (EAF) equipped with an electrode vertical translation control system that includes (i) a pump for pumping hydraulic fluid from a reservoir to a electrode lifting hydraulic cylinder, (ii) a primary single action proportional control valve in hydraulic communication between the pump and the electrode lifting hydraulic cylinder via a first hydraulic line and in hydraulic communication between the electrode lifting hydraulic cylinder and the reservoir via a second hydraulic line, and (iii) a secondary proportional valve in fluid communication with the second hydraulic line between the primary single action proportional control valve and the reservoir. The primary single action proportional control valve effects controlled hydraulically powered vertical lifting of the at least one electrode when actuated into a first position, and hydraulically unpowered gravity induced vertical dropping of the at least one electrode when actuated into a second position. The secondary proportional valve effects controlled gravity induced flow of hydraulic fluid from the electrode lifting hydraulic cylinder to the reservoir through the second hydraulic line so as to effect controlled drop of the one or more electrodes.

9 Claims, 3 Drawing Sheets

(56) References Cited

U.S. PATENT DOCUMENTS

| | | | | | |
|---|---|---|---|---|---|
| 4,177,000 | A | * | 12/1979 | Weinert | B66F 9/184<br>91/512 |
| 4,201,510 | A | * | 5/1980 | Muntjanoff | B66C 1/585<br>414/730 |
| 4,205,591 | A | * | 6/1980 | Mickelson | B66B 1/24<br>91/420 |
| 4,323,141 | A | * | 4/1982 | Ragan | B66F 3/35<br>254/93 HP |
| 4,403,680 | A | * | 9/1983 | Hillesheimer | B66F 17/00<br>187/269 |
| 4,505,339 | A | * | 3/1985 | Kramer | E02F 3/844<br>172/826 |
| 4,526,346 | A | * | 7/1985 | Galloway | B66F 7/065<br>182/69.5 |
| 4,638,886 | A | * | 1/1987 | Marietta | B66F 7/04<br>187/207 |

* cited by examiner

ELECTRODE TRANSLATION CONTROL SYSTEM FOR AN ELECTRIC ARC FURNACE

BACKGROUND

Graphite electrodes are used in electric arc furnaces (EAF) to smelt ore and melt recycled metal. The heat needed to smelt ore and melt recycled metal is generated by passing current (typically in excess of 50,000 amperes) through one or a plurality of electrodes, and forming an arc between the electrodes and the ore/metal.

EAF electrodes are made of graphite. Graphite is one of the few materials possessing both high levels of electrical conductivity and the ability to withstand the extreme heat generated in an EAF crucible.

A typical graphite electrode used in an EAF is constructed as an electrode column consisting of a series of individual electrodes joined together by graphite pins to form a single linear column. In this way, as electrodes are consumed at the distal tip of the column during the thermal process, replacement electrodes can be joined at the proximal end of the column to maintain a desired column length for extension into the crucible.

The graphite electrodes are cantilevered over the crucible by an electrode retention arm. The arm can be vertically translated by a lift system for hydraulically powered lifting of the arm and the attached graphite electrodes out from the crucible for charging the crucible with ore/scrap metal and gravity induced dropping of the arm and the attached graphite electrodes into the crucible for smelting/melting of the ore/metal.

During smelting/melting of the ore/metal it is important to maintain a proper spacing of the distal ends of the graphite electrodes from the ore/metal retained within the crucible. Excessive spacing reduces efficiency while physical contact between a graphite electrode and a solid within the crucible risks damaging the graphite electrode.

A substantial need exists for a cost effective system and method for precision control of gravity induced dropping of graphite electrodes into an EAF crucible during smelting/melting of ore/metal within the crucible.

SUMMARY OF THE INVENTION

An electrode lift system for an electric arc furnace (EAF). The electrode lift system includes at least one electrode, an electrode lifting hydraulic cylinder, and an electrode vertical translation control system.

The electrode vertical translation control system includes (i) a pump for pumping hydraulic fluid from a reservoir to the electrode lifting hydraulic cylinder, (ii) a primary single action proportional control valve in hydraulic communication between the pump and the electrode lifting hydraulic cylinder via a first hydraulic line and in hydraulic communication between the electrode lifting hydraulic cylinder and the reservoir via a second hydraulic line, and (iii) a secondary proportional valve in fluid communication with the second hydraulic line between the primary single action proportional control valve and the reservoir.

The primary single action proportional control valve is operable for (A) effecting controlled hydraulically powered vertical lifting of the at least one electrode when actuated into a first position whereby hydraulic fluid is pumped via the first hydraulic line into the electrode lifting hydraulic cylinder, and (B) effecting hydraulically unpowered gravity induced vertical dropping of the at least one electrode when actuated into a second position whereby hydraulic fluid flows under force of gravity via the second hydraulic line from the electrode lifting hydraulic cylinder to the reservoir.

The secondary proportional valve is operable for effecting controlled gravity induced flow of hydraulic fluid from the electrode lifting hydraulic cylinder to the reservoir through the second hydraulic line so as to effect controlled drop of the one or more electrodes.

The electrode lift system can include three electrodes, which can be collectively translated by a single common vertical translation control system or each independently vertically translated by one of three dedicated vertical translation control systems.

DETAILED DESCRIPTION OF A PREFERRED EMBODIMENT

Nomenclature

Nomenclature Table

| REF NO. | DESCRIPTION |
|---|---|
| 100 | Electric Arc Furnace Electrode Lift Subsystem |
| 110 | Electrode |
| 120 | Electrode Retention Arm |
| 130 | Electrode Lifting Hydraulic Cylinder |
| 140 | Electrode Vertical Translation Control System |
| 141 | First Hydraulic Line |
| 142 | Second Hydraulic Line |
| 143 | Common Hydraulic Line |
| 145 | Pump |
| 146 | Primary Single Action Proportional Control Valve |
| 146a | Stopped Position of Primary Single Action Proportional Control Valve |
| 146b | Lift Position of Primary Single Action Proportional Control Valve |
| 146c | Drop Position of Primary Single Action Proportional Control Valve |
| 147 | Secondary Proportional Valve |
| 149 | Reservoir or Tank |
| 150 | Controller for Controlling Operation of Secondary Proportional Valve |
| y | Vertical Direction |
| $y_1$ | Lift |
| $y_2$ | Drop |

Construction

Figure 1:
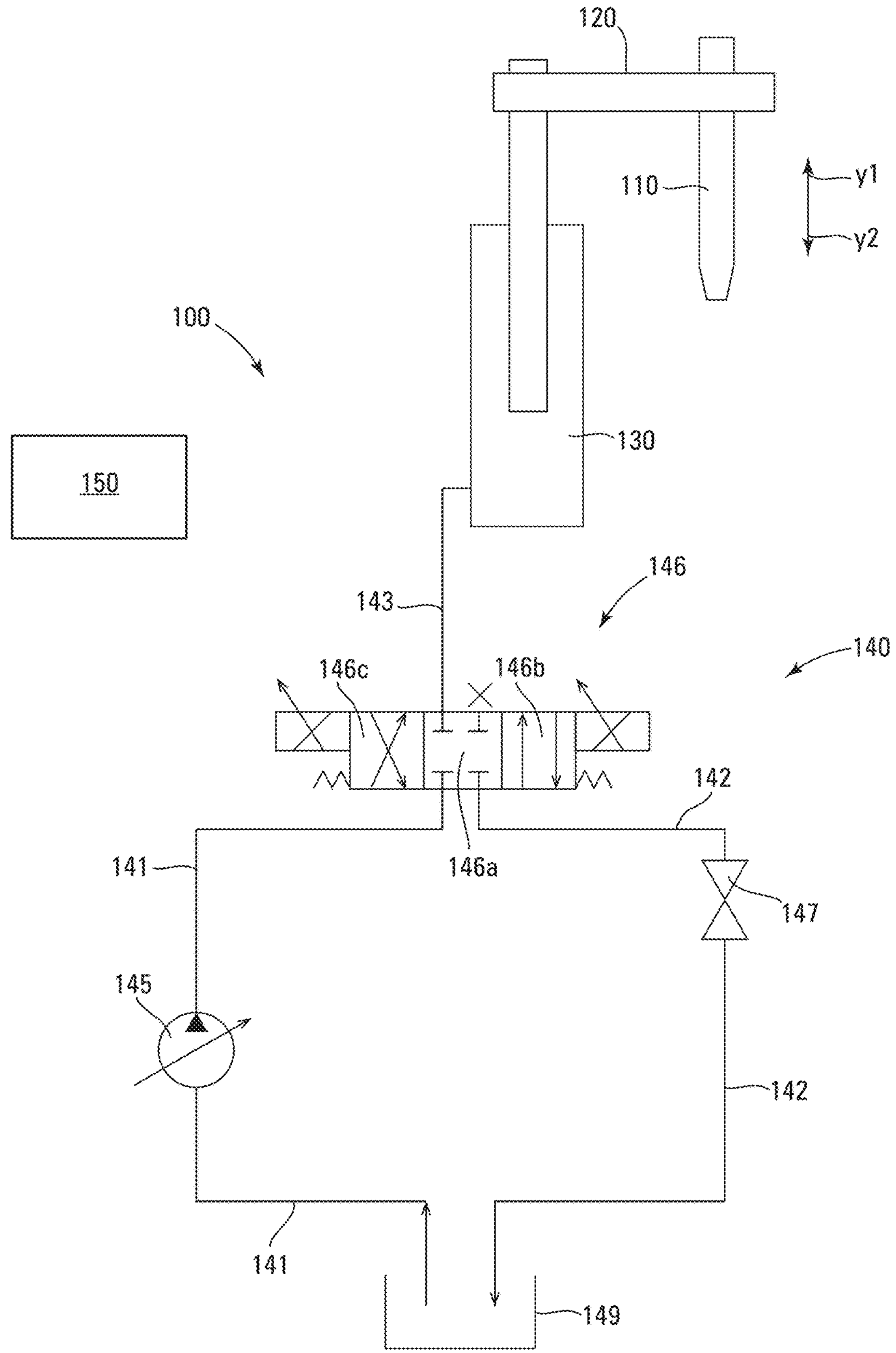
FIG. 1 is a schematic view of one embodiment of the invention.

Referring generally to FIG. 1, the invention is an electrode lift system 100 for an electric arc furnace (EAF). The electrode lift system 100 includes at least one and preferably three electrodes 110, an electrode lifting hydraulic cylinder 130, and an electrode vertical translation control system 140. The at least one electrode 110 is horizontally cantilevered away from the electrode lifting hydraulic cylinder 130 for positioning over a crucible by an electrode retention arm 120.

Figure 2:
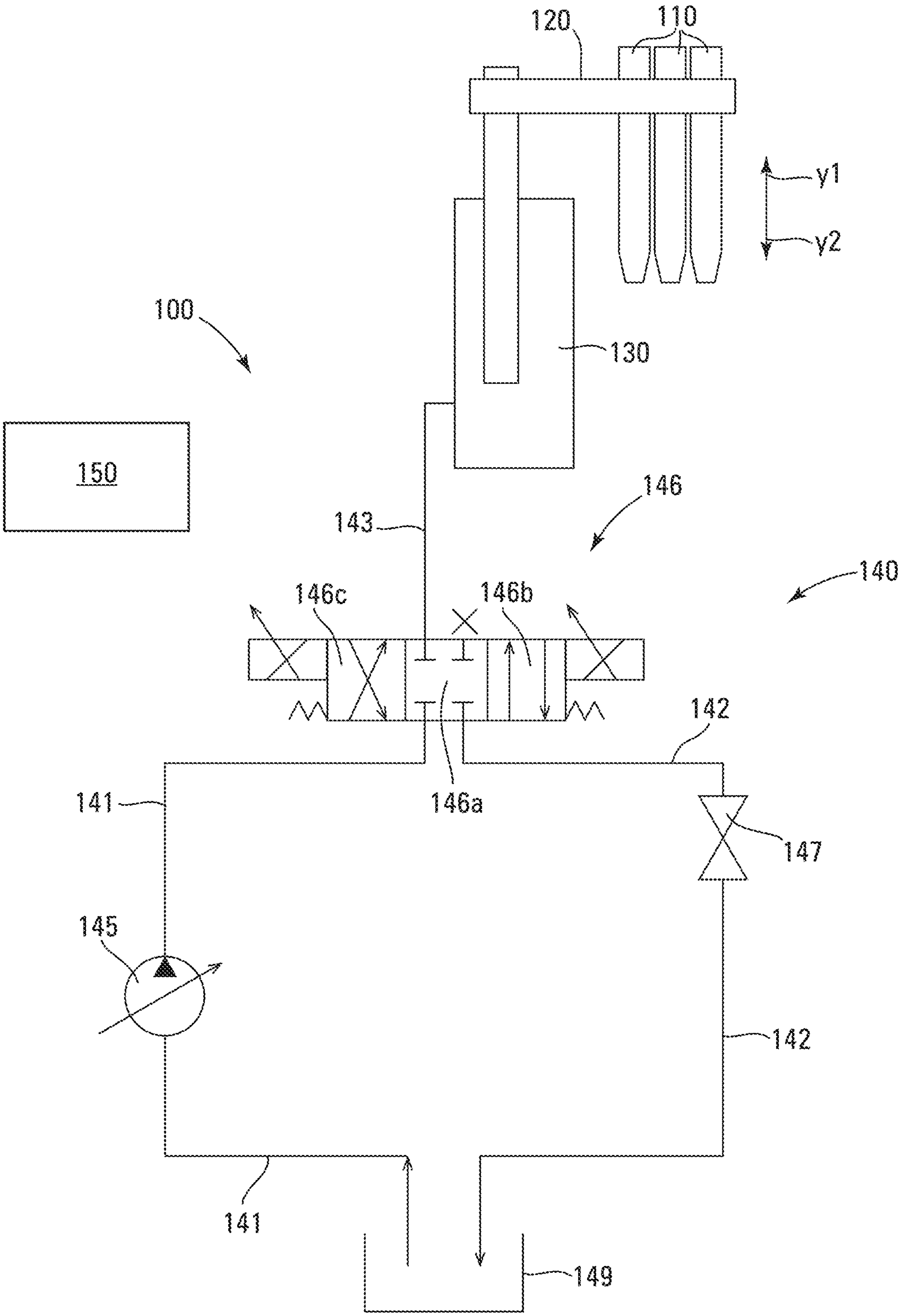
FIG. 2 is a schematic view of another embodiment of the invention with multiple electrodes collectively translated by a single common vertical translation control system.
Figure 3:
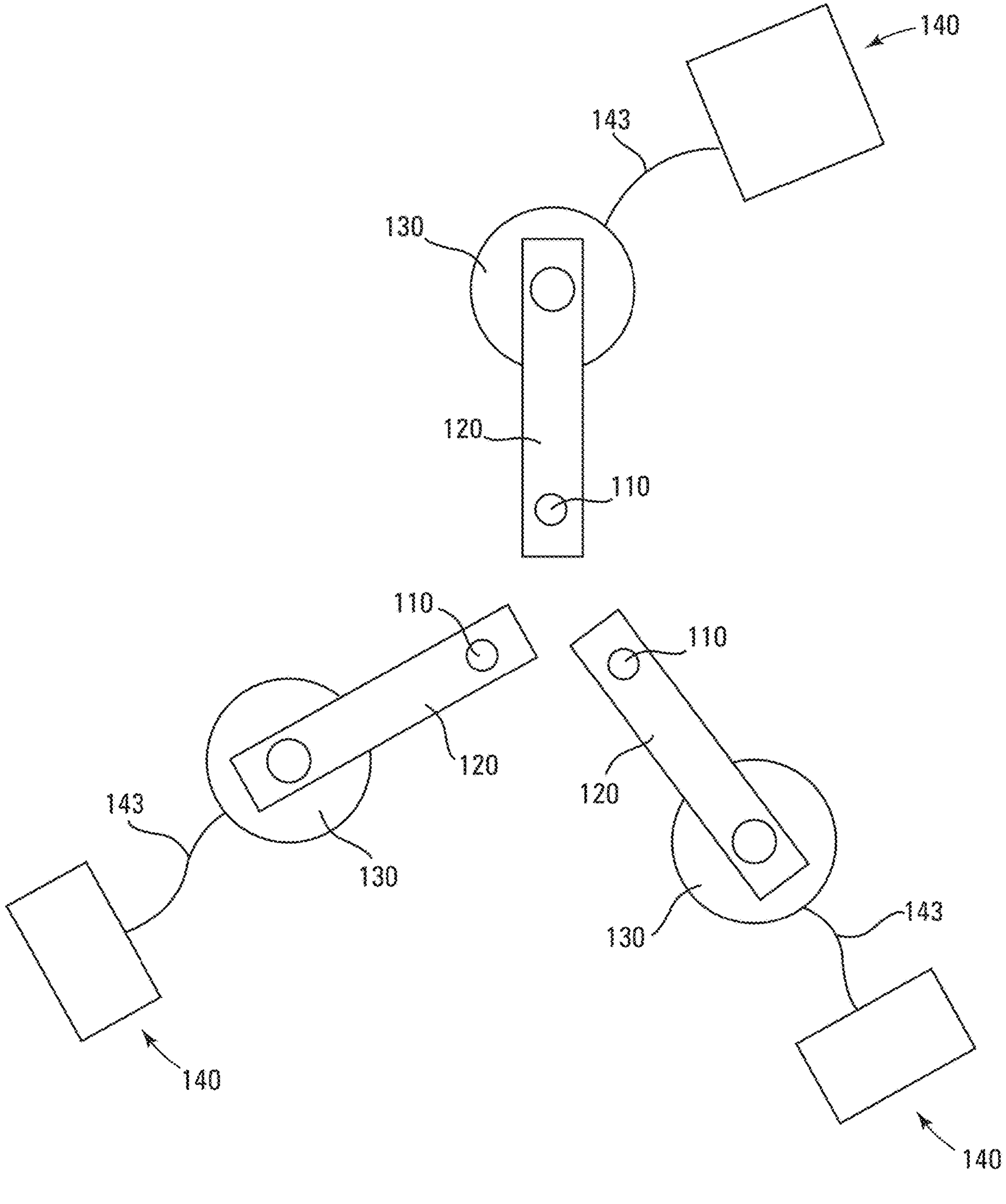
FIG. 3 is a schematic view of yet another embodiment of the invention with multiple electrodes, each independently vertically translated by one of three dedicated vertical translation control systems.

The electrode lifting hydraulic cylinder 130 acts upon the electrode retention arm 120 for vertical translation of the at least one electrode 110 relative to the crucible (not shown) as between a lifted out-of-the-way position for allowing charging of the crucible with ore/scrap metal, and a dropped position for melting of the ore/scrap metal within the crucible. The at least one electrode 110 is hydraulicly lifted $y_1$ and gravitationally dropped $y_2$. Referring to FIGS. 2 and 3, when three electrodes 110 are employed, the electrodes 100 can be collectively lifted and dropped by a single electrode lifting hydraulic cylinder 130 (FIG. 2) or each electrode 100 can be individually and separately lifted and dropped by a dedicated electrode lifting hydraulic cylinder 130 (FIG. 3).

The electrode vertical translation control system 140 includes (i) a pump 145, (ii) a primary single action proportional control valve 146, (iii) a secondary proportional valve 147, and (iv) interconnecting hydraulic fluid lines 141, 142 and 143.

The pump 145 is configured to pump hydraulic fluid from a reservoir 149 of hydraulic fluid to the primary single action proportional control valve 146 into the electrode lifting hydraulic cylinder 130 for lifting $y_1$ the at least one electrode 110.

The primary single action proportional control valve 146 is in hydraulic communication between (i) the pump 145 via a first dedicated hydraulic fluid line 141, (ii) the reservoir 149 via a second dedicated hydraulic fluid line 141, and (iii) the electrode lifting hydraulic cylinder 130 via a common hydraulic fluid line 143.

When the primary single action proportional control valve 146 is in the center (stopped) actuated position **146*a*, flow of hydraulic fluid both into and out from the electrode lifting hydraulic cylinder 130 via common hydraulic fluid line 143 is blocked. This prevents vertical lift $y_1$ and drop $y_2$ of the at least one electrode 110. The pumping of hydraulic fluid from the reservoir 149 to the electrode lifting hydraulic cylinder 130 via the first dedicated hydraulic fluid line 141 and the common hydraulic fluid line 143 is blocked, as is any gravity induced return flow of hydraulic fluid from the electrode lifting hydraulic cylinder 130 to the reservoir 149 via the common hydraulic fluid line 143 and the second dedicated hydraulic fluid line 142**.

When the primary single action proportional control valve 146 is in the right (lift) actuated position **146*b*, flow of hydraulic fluid from the pump 145 into the electrode lifting hydraulic cylinder 130 via common hydraulic fluid line 143 is opened while return flow of hydraulic fluid out from the electrode lifting hydraulic cylinder 130 via common hydraulic fluid line 143 is blocked. This results in hydraulic lifting $y_1$ of the at least one electrode 110 upon actuation of the pump 145**.

When the primary single action proportional control valve 146 is in the left (drop) actuated position **146*c*, flow of hydraulic fluid from the pump 145 into the electrode lifting hydraulic cylinder 130 is blocked while return flow of hydraulic fluid out from the electrode lifting hydraulic cylinder 130 and into the reservoir 149 via common hydraulic fluid line 143 and second dedicated hydraulic fluid line 142 is opened. This results in gravitational induced dropping $y_2$ of the at least one electrode 110**.

The speed of gravity induced drop $y_2$ can be controlled by the secondary proportional valve 147 by controlling the flow of hydraulic fluid out from the electrode lifting hydraulic cylinder 130 into the reservoir 149. The secondary proportional valve 147 is in fluid communication with the second dedicated hydraulic fluid line 142 between the primary single action proportional control valve 146 and the reservoir 149. The secondary proportional valve 147 is preferably a proportional relief valve.

A controller 150 may be employed to control flow rate through the secondary proportional valve 147 and thereby control the rate of drop $y_2$ of the at least one electrode 110. The controller 150 is preferably a remotely located controller and may be controlled by operator input or by feed-back from various operational parameter sensors such as sensed upstream hydraulic pressure acting upon the secondary proportional valve 147. In a preferred embodiment the controller 150 communicates with the programable logic controller (PLC) used to monitor and control the overall operation of the EAF and utilizes various operational data available to the PLC for controlling operation of the secondary proportional valve 147 and thereby controlling the rate of drop $y_2$ of the at least one electrode 110.

Descent of the at least one electrode 110 can even be completely or almost completely stopped while leaving the primary single action proportional control valve 146 in the left (drop) actuated position **146*c* by closing the secondary proportional valve 147**.

Operation

Starting with an empty crucible, electrode 110 in the fully lifted position, and the primary single action proportional control valve 146 in the stopped **146*a*** position, a complete smelt/melt cycle included the following sequential steps.

Ore/metal scrap is loaded into the crucible to form a "charge".

The primary single action proportional control valve 146 is actuated into the drop **146*c* position with the speed of drop $y_2$ controlled with the secondary proportional valve 147**.

When the distal ends of the at least one electrode 110 reach the desired spaced relationship with the charge an electrical current is sent to the at least one electrode 110 and the resultant electric arc begins to melt the ore/metal scrap in the crucible.

As the ore/metal scrap melts the top surface of the charge drops. In order to maintain an efficient melt the at least one electrode 110 should chase the charge and drop concomitantly. The speed of drop $y_2$ is controlled with the secondary proportional valve 147.

Upon completion of the melt, electrical current to the at least one electrode 110 is closed, the pump 145 is activated and the primary single action proportional control valve 146 actuated into the lift **146*b* position until the at least one electrode 110 is returned to the fully lifted position at which time the primary single action proportional control valve 146** is returned to the center (stopped) position.

Then, either another charge of ore/metal scrap is loaded into the crucible atop the melt already in the crucible and the melt procedure repeated, or the crucible is tilted to pour melt from the crucible, the crucible returned to its level position and then reloaded with another charge of ore/metal scrap and the melt procedure repeated.

I claim:

1. An electric arc furnace electrode lift subsystem, comprising:

(a) at least one electrode, (b) an electrode lifting hydraulic cylinder, and (c) an electrode vertical translation control system, including at least:

(i) a pump for pumping hydraulic fluid from a reservoir to the electrode lifting hydraulic cylinder, (ii) a primary single action proportional control valve in hydraulic communication between the pump and the electrode lifting hydraulic cylinder via a first hydraulic line and in hydraulic communication between the electrode lifting hydraulic cylinder and the reservoir via a second hydraulic line, the primary single action proportional control valve operable for (A) effecting controlled hydraulically powered vertical lifting of the at least one electrode when actuated into a first position whereby hydraulic fluid is pumped via the first hydraulic line into the electrode lifting hydraulic cylinder, and (B) effecting hydraulically unpowered gravity induced vertical dropping of the at least one electrode when actuated into a second position whereby hydraulic fluid flows under force of gravity via the second hydraulic line from the electrode lifting hydraulic cylinder to the reservoir, and (iii) a secondary proportional valve in fluid communication with the second hydraulic line between the primary single action proportional control valve and the reservoir operable for effecting controlled gravity induced flow of hydraulic fluid from the electrode lifting hydraulic cylinder to the reservoir through the second hydraulic line so as to effect controlled drop of the one or more electrodes.

2. The electric arc furnace electrode lift subsystem of claim 1 comprising three electrodes.

3. The electric arc furnace electrode lift subsystem of claim 1 wherein the one or more electrodes are cantilevered by at least one electrode retention arm, and the electrode lifting hydraulic cylinder is operable for vertically translating the at least one electrode retention arm.

4. The electric arc furnace electrode lift subsystem of claim 1 wherein the secondary proportional valve is a proportional relief valve.

5. The electric arc furnace electrode lift subsystem of claim 1 wherein the secondary proportional valve is controlled by a remotely located controller.

6. The electric arc furnace electrode lift subsystem of claim 1 wherein the secondary proportional valve is controlled by a remotely located feed-back controller based upon sensed upstream hydraulic pressure acting upon the secondary proportional valve.

7. The electric arc furnace electrode lift subsystem of claim 1 wherein operation of the electric arc furnace is controlled by a main programmable logic controller and the secondary proportional valve is automatically controlled by the main programmable logic controller based upon operational parameters monitored by the main programmable logic controller.

8. An electric arc furnace electrode lift subsystem, comprising:

(a) three electrodes, (b) an independently operable electrode lifting hydraulic cylinder for each electrode, and (c) an electrode vertical translation control system for independently controlling each electrode lifting hydraulic cylinder, the electrode vertical translation control systems in fluid communication with a common pump for pumping hydraulic fluid from a reservoir to the electrode lifting hydraulic cylinder and each electrode vertical translation control system including at least:

(i) a primary single action proportional control valve in hydraulic communication between the pump and the electrode lifting hydraulic cylinder via a first hydraulic line and in hydraulic communication between the electrode lifting hydraulic cylinder and the reservoir via a second hydraulic line, the primary single action proportional control valve operable for (A) effecting controlled hydraulically powered vertical lifting of the attached electrode when actuated into a first position whereby hydraulic fluid is pumped via the first hydraulic line into the electrode lifting hydraulic cylinder, and (B) effecting hydraulically unpowered gravity induced vertical dropping of the attached electrode when actuated into a second position whereby hydraulic fluid flows under force of gravity via the second hydraulic line from the electrode lifting hydraulic cylinder to the reservoir, and (ii) a secondary proportional valve in fluid communication with the second hydraulic line between the primary single action proportional control valve and the reservoir operable for effecting controlled gravity induced flow of hydraulic fluid from the electrode lifting hydraulic cylinder to the reservoir through the second hydraulic line so as to effect controlled drop of the attached electrode.

9. An electric arc furnace electrode lift subsystem, comprising:

(a) three electrodes, (b) an independently operable electrode lifting hydraulic cylinder for each electrode, and (c) an electrode vertical translation control system for independently controlling each electrode lifting hydraulic cylinder, each electrode vertical translation control system including at least:

(i) a pump for pumping hydraulic fluid from a reservoir to the electrode lifting hydraulic cylinder, (i) a primary single action proportional control valve in hydraulic communication between the pump and the electrode lifting hydraulic cylinder via a first hydraulic line and in hydraulic communication between the electrode lifting hydraulic cylinder and the reservoir via a second hydraulic line, the primary single action proportional control valve operable for (A) effecting controlled hydraulically powered vertical lifting of the attached electrode when actuated into a first position whereby hydraulic fluid is pumped via the first hydraulic line into the electrode lifting hydraulic cylinder, and (B) effecting hydraulically unpowered gravity induced vertical dropping of the attached electrode when actuated into a second position whereby hydraulic fluid flows under force of gravity via the second hydraulic line from the electrode lifting hydraulic cylinder to the reservoir, and (iii) a secondary proportional valve in fluid communication with the second hydraulic line between the primary single action proportional control valve and the reservoir operable for effecting controlled gravity induced flow of hydraulic fluid from the electrode lifting hydraulic cylinder to the reservoir through the second hydraulic line so as to effect controlled drop of the attached electrode.

* * * * *